Patented June 15, 1954

2,681,316

UNITED STATES PATENT OFFICE 2,681,316

OIL COMPOSITIONS STABILIZED AGAINST OXIDATIVE DETERIORATION

Oliver L. Harle, Berkeley, Calif., assignor to California Research Corporation, San Francisco, Calif., a corporation of Delaware No Drawing. Application March 1, 1952,
Serial No. 274,518

5 Claims. (Cl. 252—47.5)

The present invention relates to the stabilization of oils against oxidative deterioration. More particularly, the invention has to do with the preparation of an oleaginous composition comprising a major amount of a normally oxidizable oil and a minor amount each of a hydroxy aromatic compound and of a thiocarbonic acid derivative, each being selected from specific classes of compounds. In accordance with the invention, it has been found that the combination of the aforesaid thiocarbonic acid derivative and hydroxy aromatic compound has a synergistic anti-oxidant effect.

Among the adverse effects caused by oxidation may be mentioned the formation of corrosive acidic products, sludges, varnishes, resins and other oil-insoluble products, as for example, with mineral oils. Other oils, such as certain synthetic hydrocarbons, tend to further polymerize on oxidation, thus becoming undesirably viscous, while other synthetic oils, for example the polyalkylene glycol type, tend to depolymerize giving off volatile products. Other oils thicken and become rancid, for example the animal and vegetable fatty oils.

Now I have found that I can substantially increase the resistance to oxidation of these oils and others, whereby their quality and nature are maintained unimpaired over a long period of time either during use or in storage, by the incorporation in the oil of a small amount of a hydroxy aromatic compound in addition to a small amount of a non-acidic thiocarbonic acid derivative selected from the class consisting of esters, amides, salts, acyl disulfides and thioanhydrides of thiocarbonic acids.

More specifically, the non-acidic thiocarbonic acid derivative is one which is soluble in the oil to the extent of at least about 0.05%, preferably about 0.1%, by weight of the finished oil, and which has a molecular weight of at least about 150.

In general, the aforesaid thiocarbonic acid derivative may be represented by the following formulas:

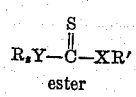
ester

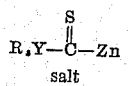
salt

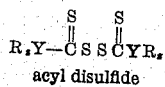
acyl disulfide

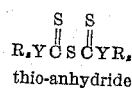
thio-anhydride

In the above formulas, like letters have the same significance. Thus, R and R' represent like or different organic groups, such as alkyl groups; Y, oxygen, sulfur, or nitrogen; X, oxygen or sulfur; $z$, the integer 1 when Y is oxygen or sulfur, and 2, when Y is nitrogen; C, carbon; S, sulfur; and Zn, zinc.

As above indicated, R and R' are substituted or unsubstituted alkyl or aryl groups. The substituent groups can be amino, hydroxyl, mercapto, alkoxy, aryloxy, thio, alkyl, aryl, alkaryl, or arylalkyl radicals.

Specific examples of thiocarbonic acid derivatives contemplated by the invention are zinc di-n-butyldithiocarbamate, zinc i-propylxanthate, zinc sec-amyltrithiocarbonate, zinc phenyl-n-butyl dithiocarbamate, butyl di-n-butyl dithiocarbamate, tolyl di-n-butyldithiocarbamate, dibenzyltrithiocarbonate, di-i-butylxanthate, zinc salt of dithiocarbonic acid morpholide, tetramethyl thiouramdisulfide, di-i-propyl xanthogen, and sec-butylxanthic thioanhydride.

In general, the amount of thiocarbonic acid derivative required for substantial inhibition of the base oil against oxidation ranges from about 0.03% to about 10% by weight of the finished oil, a satisfactory working amount residing within about the range of 0.1% to 1.0%, with an optimum of about 0.2% by weight of the finished oil.

The hydroxyaromatic compound contemplated by the invention is one which has a minimum solubility in the base oil of about 0.05 per cent by weight of said oil, and preferably about 0.5 per cent. Moreover, the hydroxy-aromatic compound is one which has at least a total of ten carbon atoms in the molecule. These compounds are ring-substituted phenols, ring-substituted or unsubstituted naphthols, anthrols and the like.

The substituent group can be hydroxy, amino, mercapto, alkoxy, aryloxy, thio, alkyl, aryl, alkaryl and arylalkyl radicals. However, substituent groups containing oxygen which are acidic or acid strengthening in nature, such as nitro, carboxyl and sulfonic acid radicals, which are not further oxidizable are less desirable and for practical purposes are avoided.

Preferred classes of hydroxyaromatic compounds are naphthols and phenols, the latter being substituted on the para position with a hydrocarbon group, such as an alkyl group; and phenols having a second free hydroxyl group (dihydric phenol) or amino group (amino phenol) on either the ortho- or para-position to give an ortho- or para-dihydroxy benzene or an ortho- or para-aminohydroxy benzene.

Specific examples of hydroxy aromatic compounds falling within the purview of the invention are t-butylhydroquinone, di-t-butyl resorcinol, t-butylcatechol, 1,2-dihydroxynaphthalene, 1,4-dihydroxynaphthalene, 1,2-dihydroxy-4-phenyl benzene, 5-octyl-1-hydroxynaphthalene, 1,3-dihydroxy-5-cetoxybenzene, 1,2-dihydroxythianthrene, 1-hydroxy-4-amino naphthalene, 1-hydroxy-4-isooctylamino benzene, β-naphthol, α-naphthol, di-β-naphthol, 4-t-butyl-2-phenylphenol, 2,2'-di(p-hydroxyphenyl) propane, 4-amino-3-pentadecylphenol, and 2,6-di-t-butyl p-cresol.

In general, the amounts of hydroxy aromatic compound employed in accordance with the invention reside within about the range of 0.05% to 5.0% by weight of the finished oil, and preferably 0.1% to 2.0%, by weight of the finished oil.

Examples of commercially available base oils which may be benefited by the practice of the present invention are highly refined mineral hydrocarbon lubricating oils, which because of the exhaustive refining thereof contain substantially no aliphatic sulfur materials, for example, white oil. Other base oils are synthetic hydrocarbon oils or olefin polymer oils, for example the polybutenes and others derived from the lower olefins, such as ethylene, the propylenes, pentenes, etc., and from the Fischer-Tropsch process. Additional examples of base oils are the polyalkylene glycols of lubricating oil viscosity derived most advantageously from 1,2-propylene oxide, these oils preferably having the terminal hydroxyl groups esterified and/or etherified. Also advantageously treated in accordance with the invention are the diester oils, that is, those derived from the esterification of certain dicarboxylic acids, for example adipic and sebacic, with alcohols, for example butyl hexyl, and octyl alcohols. Another important class of synthetic base oils are those containing silicon, for example the orthosilicates, preferably those in which the alkyl groups attached to oxygen bound to silicon contain at least three carbon atoms in branched chain structure, for example bis (2-butyl) bis (2-ethyl-1-butyl) silicate, and isopropyl-tris(2-pentyl) silicate; and the polysiloxanes such as hexa-(2-ethyl-1-butoxy) disiloxane.

A convenient method of measuring the resistance to oxidation possessed by the compositions prepared in accordance with the invention is the use of the apparatus and procedure described in Industrial and Engineering Chemistry, vol. 28, p. 26 (1936), wherein the rate of oxygen absorption at constant pressure by a definite weight of oil is regarded as a measure of the oxidative stability of the oil. According to this procedure, the oil sample is placed in an absorption cell, provided in the bottom with a fine-fritted glass filter to disperse the oxygen stream, circulating through the system at a constant rate, into fine bubbles. In obtaining the data hereinbelow appearing, the following modified apparatus and procedure were employed.

The oxidation or absorption cell is constructed of a large glass tube with the head portion having a connection for introducing oxygen, an annular space surrounding the upper end of the tube and a fitting for a removable high speed glass stirrer. The annular space contains potassium hydroxide pellets for the removal of water, carbon dioxide, volatile aldehydes, etc. The lower portion of the cell which contains the sample to be tested is immersed in an oil bath at a temperature of about 340° F. During the test, the oil sample is rapidly agitated by means of a high speed stirrer and is kept under a pressure of about 1 atmosphere of pure oxygen, the volume of oxygen added being automatically recorded. The time in hours required for 100 grams of oil to absorb 1200 cc. of oxygen is called the "Induction Period" (I. P.); and represents the point at which the sample begins to absorb oxygen or oxidize.

The following tabulated data were obtained from a number of experiments performed in accordance with the test above described.

In Table I, the base oil employed was a medicinal white oil having a viscosity of about 350 SSU at 100° F. It was prepared from a suitable distillate fraction of a California naphthenic type crude by phenol treatment followed by exhaustive treatment with fuming sulfuric acid and finished by percolating through fuller's earth.

TABLE I

*Anti-oxidant effect of hydroxyaromatic compound and thiocarbonic acid derivative on white oil*

| Thiocarbonic Acid Derivative | Percent Thiocarbonic Acid Derivative | Percent 2,2'-di-(p-hydroxyphenyl) Propane | Induction Period, Hrs. at 340° F. | | |
|---|---|---|---|---|---|
| | | | Without Thiocarbonic Acid derivative and 2,2'-di(p-hydroxyphenyl) Propane | Without Thiocarbonic acid Derivative, but with 2,2'-di-(p-hydroxyphenyl) Propane | Without 2,2'-di(p-hydroxyphenyl) Propane, but with Thiocarbonic Acid Derivative |
| 1. Zinc di-n-butyl dithiocarbamate | 0.1 | 0.1 | 29 | 1.0 | 7.1 |
| 2. Zinc i-propylxanthate | 0.1 | 0.1 | 21 | 1.0 | 1.3 |
| 3. Tetramethyl thiouramdisulfide | 0.1 | 0.1 | 24 | 1.0 | 0.9 |
| 4. Di-sec.-butyl xanthogen | 0.1 | 0.1 | 23 | 1.0 | 0.7 |
| 5. Butyl di-n-butyldithiocarbamate | 0.1 | 0.1 | 20 | 1.0 | 0.2 |
| 6. Di-i-propylxanthic thioanhydride | 0.1 | 0.1 | 14 | 1.0 | 0.9 |
| 7. Zinc t-butyltrithiocarbonate | 0.1 | 0.1 | 31 | 1.0 | 2.1 |

It will be observed from these data that the combined inhibiting effect of each of the thiocarbonic acid derivatives and the aromatic amine is far greater than the sum of the effects of the individual additives used separately.

In Table II, the polypropylene glycol oil was an ethylhexanol-initiated propene oxide polymer of molecular weight about 900.

TABLE II

*Anti-oxidant effect of aromatic amine and thio-carbonic acid derivatives on polypropyleneglycol oil*

| Thiocarbonic Acid Derivative | Percent Thiocarbonic Acid Derivative | Percent 2,2'-di(p-hydroxyphenyl) Propane | Induction Period, Hrs. at 340° F. | |
|---|---|---|---|---|
| | | | With Thiocarbonic acid derivative and 2,2'-di(p-hydroxyphenyl) Propane | Without Thiocarbonic acid Derivative, but with 2,2'-di(p-hydroxyphenyl) Propane |
| 1. Di-i-propyl xanthogen | 2.1 | 0.5 | 3.5 | 0.1 |
| 2. Tetramethylthiouramdisulfide | 1.7 | 0.5 | 4.0 | 0.1 |
| 3. Di-n-butyldithiocarbamate-initiated propene oxide polymer (Mol. Wt. about 500) | 10 | 0.5 | 4.0 | 0.1 |
| 4. Butylxanthate-initiated propene oxide polymer (Mol. Wt. about 500) | 10 | 0.5 | 3.0 | 0.1 |

Table III is intended to illustrate the anti-oxidant effect on the same base oil as employed in Table I by a representative number of hydroxyaromatic compounds and tetramethyl-thiouramdisulfide.

TABLE III

*Anti-Oxidant effect of various hydroxyaromatic compounds and a thiocarbonic acid derivative on white oil*

| Hydroxyaromatic Compound | Percent Hydroxy-Aromatic Compound | Percent Tetramethylthiouramidisulfide | Induction Period, Hrs. at 340° F. | | |
|---|---|---|---|---|---|
| | | | With Tetramethyl Thiouramidisulfide and Hydroxyaromatic Compound | Without Tetramethylthiouramdisulfide, but with Hydroxyaromatic Compound | Without Hydroxyaromatic Compound, but with Tetramethylthiouramidisulfide |
| 1. 2,6-Di-t-butyl-p-cresol | 0.1 | 0.1 | 6.5 | 2.1 | 0.9 |
| 2. p-t-Butylcatechol | 0.1 | 0.1 | 7.3 | 1.5 | 0.9 |
| 3. 4-t-Butyl-2-phenylphenol | 0.1 | 0.1 | 3.4 | 0.6 | 0.9 |
| 4. 2,2'-Di(p-hydroxyphenyl) propane | 0.1 | 0.1 | 21.0 | 1.0 | 0.9 |
| 5. 2-Pentadecylhydroquinone | 0.1 | 0.1 | 21.0 | 2.3 | 0.9 |
| 6. 4-Amino-3-pentadecylphenol | 0.1 | 0.1 | 31.0 | 3.2 | 0.9 |
| 7. α-Naphthol | 0.1 | 0.1 | 12.9 | 4.1 | 0.9 |
| 8. β-Naphthol | 0.1 | 0.1 | 7.2 | 1.0 | 0.9 |
| 9. Di-β-Naphthol | 0.1 | 0.1 | 5.1 | 0.2 | 0.9 |

The data accumulated in Table IV illustrates the anti-oxidant effect of hydroxyaromatic compounds and thiocarbonic acid derivatives of the types defined on a representative number of base oils.

TABLE IV

*Anti-oxidant effect of hydroxyaromatic compound and thiocarbonic acid derivative on various base oils*

| Base Oil | Induction Period, Hrs. at 340° F. | | |
|---|---|---|---|
| | Except as indicated, with 0.1% p-tert.-Butyl Catechol and 0.1% Di-sec.-butylxanthogen | Except as indicated, only 0.1% p-tert.-Butyl Catechol | Except as indicated, only 0.1% Di-sec.-butyl-xanthogen |
| Polybutene polymer—M. W., about 400 | 3.6 (0.2% p-t-butyl catechol; 0.2% Di-sec-butyl-xanthogen) | 0.0 (0.2% p-t-butyl catechol) | 0.0 (0.2% Di-sec.-butyl-xanthogen) |
| Bis(2-ethylhexyl) sebacate | 32.0 | 3.2 | 1.2 |
| Tetra-(2-ethylbutyl) silicate | 5.4 | 0.8 | 0.0 |
| Tricresyl phosphate | 12.0 | 2.8 | 1.4 |
| Polypropylene glycol [1] | 3.7 (0.5% p-t-butyl catechol; 1.7% Di-sec.-butyl-xanthogen) | 0.0 (0.5% p-t-butyl catechol) | 0.0 (1.7% Di-sec.-butyl-xanthogen) |
| Polypropylene glycol [2] + 50%, by volume, mineral white oil [3] | 2.9 | 0.1 | 0.0 |
| Hexa-sec. butyldisiloxane | 6.0 | 0.4 | 0.3 |

[1] Ethylhexanol-initiated propene oxide polymer, Mol. Wt. about 900.
[2] "Polypropyleneglycol"=isooctanol-initiated propene oxide polymer acetate, Mol. Wt. about 600.
[3] "Mineral white oil"=stock prepared as previously described (Page 6), but with viscosity of about 72 SSU at 100° F.

Obviously, many modifications and variations of the invention as hereinbefore set forth may be made without departing from the spirit and scope thereof, and therefore only such limitations should be imposed as are indicated in the appended claims.

I claim:
1. An oil composition having improved stability toward oxidation consisting in major portion of a normally oxidizable oil, together with from about 0.1 to 1% by weight of a sulfur-containing compound selected from the group consisting of tetramethyl thiouramdisulfide and di-sec.-butylxanthogen and about 0.1 to 2% by weight of a hydroxy-substituted aromatic hydrocarbon selected from the group consisting of 2,2'-di(p-hydroxyphenyl) propane and p-tert.-butylcatechol.

2. An oil composition having improved stability toward oxidation consisting in major portion of a normally oxidizable oil, together with from about 0.1 to 1% by weight of di-sec.-butylxanthogen and about 0.1 to 2% by weight of 2,2'-di(p-hydroxyphenyl) propane.

3. An oil composition having improved stability toward oxidation consisting in major portion of a normally oxidizable oil, together with from about 0.1 to 1% by weight of tetramethyl thiouramdisulfide and about 0.1 to 2% by weight of 2,2'-di(p-hydroxyphenyl) propane.

4. An oil composition having improved stability toward oxidation consisting in major portion of a normally oxidizable oil, together with from about 0.1 to 1% by weight of tetramethyl thiouramdisulfide and about 0.1 to 2% by weight of p-tert.-butylcatechol.

5. An oil composition having improved stability toward oxidation consisting in major portion of a normally oxidizable oil, together with from about 0.1 to 1% by weight of di-sec.-butylxanthogen and about 0.1 to 2% by weight of p-tert.-butylcatechol.

References Cited in the file of this patent

UNITED STATES PATENTS

| Number | Name | Date |
| --- | --- | --- |
| 2,335,017 | McNab et al. | Nov. 23, 1943 |
| 2,394,536 | Denison et al. | Feb. 12, 1946 |
| 2,400,106 | Denison et al. | May 14, 1946 |
| 2,440,530 | Yates | Apr. 27, 1948 |
| 2,580,274 | Bergstrom et al. | Dec. 25, 1951 |